United States Patent [19]

Akita et al.

[11] Patent Number: 5,573,314
[45] Date of Patent: Nov. 12, 1996

[54] HYDRAULIC BRAKE SYSTEM WITH ARRANGEMENT FOR IMPROVING THE BRAKE ACTUATION RESPONSE TIME

[75] Inventors: Tokihiko Akita, Davis; Andrew A. Frank, El Macero, both of Calif.

[73] Assignee: Imra America, Inc., Ann Arbor, Mich.

[21] Appl. No.: 394,613

[22] Filed: Feb. 22, 1995

[51] Int. Cl.$^6$ .................................................. B60T 13/16
[52] U.S. Cl. ............................ 303/10; 188/72.2; 188/346
[58] Field of Search .................................. 188/72.2, 72.3, 188/72.4, 72.6, 72.7, 346, 355, 358, 559; 303/10, 116.1, 116.2, 87

[56] References Cited

U.S. PATENT DOCUMENTS

| | | | |
|---|---|---|---|
| 3,499,689 | 3/1970 | Carp et al. . | |
| 3,637,264 | 1/1972 | Leiber et al. . | |
| 3,743,060 | 7/1973 | Hendrickson | 188/72.2 |
| 3,869,024 | 3/1975 | Hauth et al. | 188/72.2 X |
| 4,333,550 | 6/1982 | Shirai | 188/72.2 |
| 4,375,250 | 3/1983 | Burgdorf | 188/72.2 |
| 4,603,920 | 8/1986 | Otsuki et al. . | |
| 4,724,934 | 2/1988 | Howell | 188/72.2 X |
| 4,842,343 | 6/1989 | Akiyoshi et al. . | |
| 4,927,213 | 5/1990 | Burgdore . | |
| 4,934,761 | 6/1990 | Sanvageot et al. | 303/93 |
| 4,986,614 | 1/1991 | Ricker et al. . | |
| 5,000,523 | 3/1991 | Mikhaeil-Boules et al. . | |
| 5,011,237 | 4/1991 | Matouka et al. . | |
| 5,026,125 | 6/1991 | Matouka et al. . | |
| 5,029,950 | 7/1991 | Vennemeyer et al. . | |
| 5,071,202 | 12/1991 | Fabris et al. . | |
| 5,090,581 | 2/1992 | Schenk et al. | 188/72.1 |
| 5,112,116 | 5/1992 | Mikhaeil-Boules et al. . | |
| 5,257,192 | 10/1993 | Masaki . | |
| 5,288,142 | 2/1994 | Burgdorf | 303/116.2 X |

OTHER PUBLICATIONS

"Road Testng of Wheel Slip Control Systems in the Laboratory", E. E. Stewart et al., International Automotive Engineering Congress and Exposition, Detroit, Mich., Jan. 1969, pp. 5–13.

"A New Anti–Skid–Brake System for Disc and Drum Brakes", H. Schürr et al., International Congress and Exposition, Detroit, Michigan, Feb. 1984, pp. 289–301.

"Four Years of Experience with 4–Wheel Antiskid Brake Systems (ABS)", H. Leiber et al., International Congress and Exposition, Detroit, Mich., Feb. 1983, pp. 241–248.

Automotive Handbook, published by Robert Bosch GmbH, 1986, pp. 528–535.

Primary Examiner—Lee W. Young
Attorney, Agent, or Firm—Burns, Doane, Swecker & Mathis, LLP

[57] ABSTRACT

A hydraulic brake system for braking a vehicle wheel includes a hydraulic fluid source, a pump connected to the hydraulic fluid source for pumping hydraulic fluid based on operation of an operating member of the vehicle and a connecting arrangement having one end connected to the pump. A wheel cylinder which is adapted to be mounted adjacent a brake disk of a vehicle wheel includes a brake pad element for being urged against the brake disk upon the application of a hydraulic fluid pressure to impart a braking force to the brake disk. The brake pad element is movable with the brake disk when the brake disk element is urged against the brake disk. In addition, a movable pressure increasing element is positioned adjacent the brake pad element and is movable away from the brake pad element as a result of the brake pad element moving with the brake disk. As a result, an increase in pressure in the wheel cylinder arises in a relatively rapid manner to compensate for compliant characteristics in the braking system. The braking system also includes other arrangements and other features for effecting a similar result. The result is a brake system having an improved reaction time.

20 Claims, 5 Drawing Sheets

HYDRAULIC BRAKE SYSTEM WITH ARRANGEMENT FOR IMPROVING THE BRAKE ACTUATION RESPONSE TIME

FIELD OF THE INVENTION

The present invention relates to a brake system and more particularly to a hydraulic brake system for applying a braking force to a brake disk of a vehicle wheel.

BACKGROUND OF THE INVENTION

Hydraulic brake systems are known which include a motor driven pump for pumping hydraulic fluid to a wheel cylinder. The hydraulic fluid pumped by the pump causes actuation of the wheel cylinder whereby a brake pad is urged against the brake disk to impart a braking force to the vehicle wheel. In these systems, a brake line and a hose are provided to connect the pump to the wheel cylinder so that hydraulic fluid is able to flow to the wheel cylinder. This hose is made of a compliant material which expands under the pressure of the hydraulic fluid being pumped from the pump to the wheel cylinder. When the hose expands, a volumetric increase in the hose occurs which means that the response time of the brake system is reduced since a greater volume of space in the hose must be filled with hydraulic fluid to effect actuation of the wheel cylinder. A certain amount of compliance is also associated with the brake line, although typically to a lesser degree than the flexible hose. This compliance of the brake line also contributes to reducing the response time of the braking system.

Hydraulic brake systems also possess other characteristics that introduce compliance into the brake system. For example, the hydraulic fluid utilized in the brake system typically possesses compliant characteristics to the extent the fluid is somewhat compressible. This compliant or compressible nature of the hydraulic fluid means that when the hydraulic fluid is pumped to the wheel cylinder, the fluid is compressed to at least some extent, thereby reducing the reaction time of the brake system.

Another aspect of the brake system which contributes to the creation of compliance is the brake caliper. When hydraulic brake pressure is applied to the wheel cylinder, the movable brake pad is pushed into contact with the brake disk and the brake caliper body is moved to press the other brake pad against the brake disk. During this operation, the brake caliper can experience a slight deflection or deformation. This slight deflection or deformation results in a volumetric increase behind the movable brake pad which introduces compliance into the brake system. Additionally, the initial movement of the movable brake pad introduces compliance into the system.

To compensate for these various types of compliance, either individually or collectively, and improve the response time of the brake actuation, a motor having a greater power output can be employed. However, that involves the use of a motor of rather large size which means that more space is required. Further, the larger size motor is heavier and more costly than would otherwise be the case.

SUMMARY OF THE INVENTION

In view of the foregoing, a need exists for a hydraulic brake system which is able to compensate for compliance from the aforementioned sources, and any other sources, to thereby provide an improved response time while not requiring the use of a larger motor. In accordance with one aspect of the present invention, a hydraulic brake system for a vehicle includes a master cylinder for supplying brake pressure through operation of an operating member of a vehicle, a brake caliper adapted to be mounted adjacent a rotatable brake disk of a vehicle wheel, and a pump connected to the brake caliper for pumping hydraulic fluid to the brake caliper. The pump is connected to the brake caliper by a hollow member which possesses compliant characteristics and which expands when hydraulic fluid is pumped through the hollow member from the pump. A brake pad is mounted on the caliper and is movable toward the brake disk as a result of hydraulic fluid pressure to impart a braking force to the brake disk. The brake pad is also movable with the brake disk when the brake pad is urged against the brake disk. A pressure increasing is positioned adjacent the brake pad and is movable toward and away from the brake pad. An arrangement is also provided for causing the pressure increasing element to move away from the brake pad when the brake pad is urged against and moves with the brake disk to thereby result in a relatively fast increase in pressure which effects a relatively fast filling in of the volumetric increase caused by the expansion of the hollow member.

In accordance with another aspect of the present invention, a hydraulic brake system for braking a vehicle wheel includes a hydraulic fluid source and a connecting system having one end connected to the hydraulic fluid source and an oppositely located second end. A brake caliper is provided for being mounted adjacent a brake disk of a vehicle wheel and the brake caliper is connected to the second end of the connecting system. The brake caliper includes a brake pad element for being urged against the brake disk upon the application of a hydraulic fluid pressure to impart a braking force to the brake disk, with the brake pad element being moved with the brake disk when the brake pad element is urged against the brake disk. A pressure increasing device is also provided for automatically forcing hydraulic fluid from the caliper toward the fluid source as a result of the brake element being moved with the brake disk to increase the pressure upstream of the brake caliper in a relatively rapid manner and thereby compensate for compliant characteristics in the brake system.

According to another aspect of the invention, a hydraulic brake system includes a master cylinder for supplying hydraulic fluid, a brake caliper adapted to be mounted adjacent a rotatable brake disk of a vehicle wheel, and a connecting arrangement connecting the master cylinder and the brake caliper for delivering hydraulic fluid under pressure from the master cylinder to the brake caliper upon operation of an operating member of the vehicle. The brake caliper includes a movable brake pad element which is movable in a first direction towards the rotatable brake disk under hydraulic pressure from the master cylinder so as to be urged into contacting engagement with the rotating brake disk to impart a braking force to the rotating brake disk and which is movable in a second direction opposite the first direction. As the brake pad element is urged into contacting engagement with the brake disk, the brake pad element is dragged by the rotating brake disk. An arrangement is also provided for causing the brake pad element to automatically move, as a result of the brake pad element being moved with the rotating brake disk, in the second direction while hydraulic fluid is being supplied under pressure from the master cylinder to the brake caliper to effect a relatively rapid increase in pressure upstream of the brake pad element and compensate for compliant characteristics associated with the brake system.

BRIEF DESCRIPTION OF THE DRAWING FIGURES

Additional features associated with the present invention will become more apparent from the detailed description set forth below considered in conjunction with the accompanying drawing figures in which like reference numerals identify like elements and wherein.

DETAILED DESCRIPTION OF THE PREFERRED EMBODIMENTS

Figure 1:
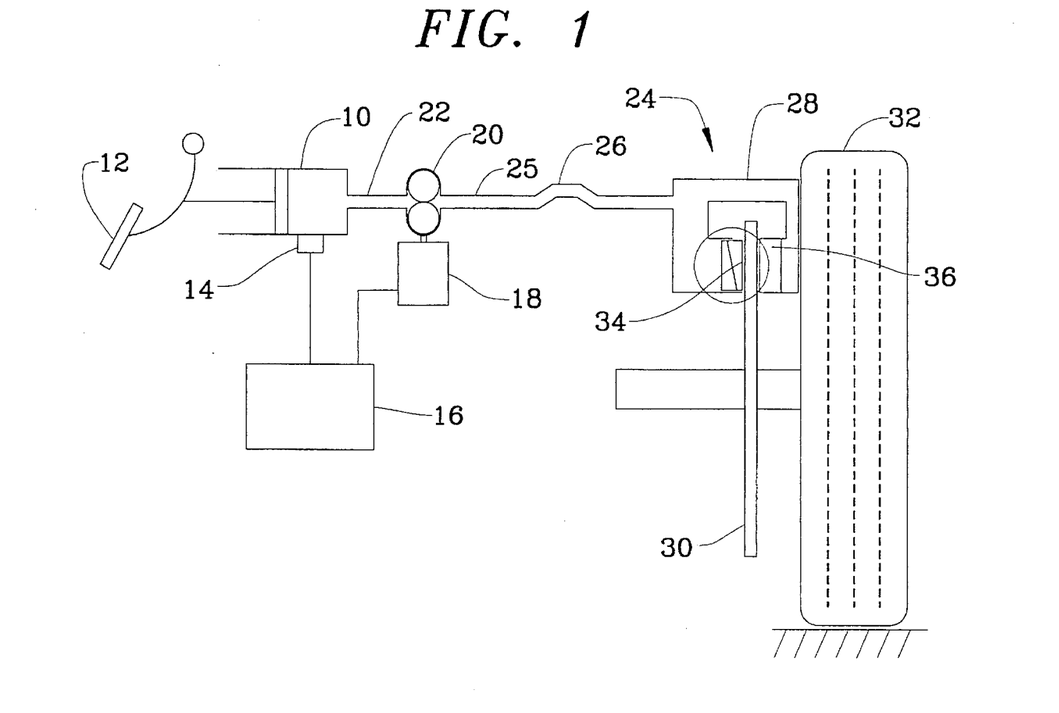
FIG. 1 is a schematic illustration of a hydraulic brake system in accordance with one aspect of the present invention.

With reference to FIG. 1, the brake system according to the present invention includes a hydraulic fluid source or master cylinder 10 that is operational by way of an operating lever or brake pedal 12 of a vehicle. A sensor 14 is operatively associated with the master cylinder 10, or possibly the brake pedal 12. The sensor 14 transmits a signal representative of the pressure in the master cylinder 10, or the force applied to the brake pedal 12, to a controller 16. The controller 16 is in turn connected to a motor 18 which is adapted to drive a positive displacement pump 20. In the illustrated embodiment, the pump 20 is a bi-directional gear pump. However, it is to be understood that other types of pumps could be employed. The controller 16 transforms the signal from the sensor 14 into control variables (voltage or current) of the electric motor 18 which can be an AC electric servo-motor or a DC electric servo-motor. The master cylinder 10 is connected to the pump 20 through a conduit 22.

The pump 20 is connected to a wheel cylinder 24 by way of a brake line 25 and a hose 26. The hose 26 is made of compliant material which expands when hydraulic fluid is pumped from the pump 20 to the wheel cylinder 24. The brake line 25 also tends to expand, but typically to a lesser degree than the hose 26. As can be readily appreciated, the expansion of the hose 26 and the brake line 25 results in a volumetric increase inside the hose and the brake line which means that a greater volume of fluid is necessary to fill the hose 26 and the brake line 25.

As further illustrated in FIG. 1, the wheel cylinder 24 includes a caliper 28 which positions brake pad elements on opposite sides of a brake disk 30. The brake disk 30 forms a part of the vehicle wheel on which is mounted the tire 32. In the embodiment illustrated in FIG. 1, the brake pad elements carried by the caliper 28 include a brake pad element 34 positioned on the left side of the brake disk 30 which is movable with respect to the brake caliper 28 and a brake pad element 36 positioned on the right side of the brake disk 30 which is fixed with respect to the caliper 28.

Figure 2:
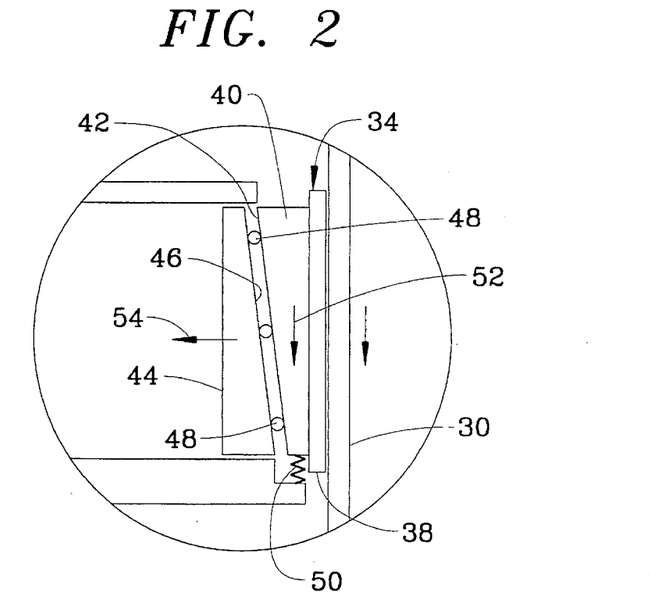
FIG. 2 is an enlarged view of the portion of the system which is circled in FIG. 1 illustrating the brake pad element and the pressure increasing element.

As seen in more detail in FIG. 2, the brake pad element 34 includes a brake pad 38 which is fixed to a wedge element 40, and a pressure increasing wedge element 44. The wedge element 40 is provided with an inclined surface 42 and the pressure increasing wedge element 44 is also provided with its own inclined surface 46. The inclined surfaces 42, 46 of the two wedge elements 40, 44 face one another and are inclined in opposite directions. Preferably, the inclined surfaces 42, 46 are parallel to one another.

Positioned between the inclined surfaces of the two wedge elements 40, 44 are several bearings or roller elements 48 which permit the wedge elements 40, 44 to easily move relative to one another. Also, a spring or other suitable biasing element 50 is operatively associated with the wedge element 40 for urging the wedge element 40 in a direction opposite the direction indicated by the arrow 52.

In operation, as hydraulic fluid is pumped to the wheel cylinder 24 by the pump 20, the brake pad 38 is pressed against the brake disk 30 to impart a braking force to the brake disk 30. Once the brake pad 38 has contacted the brake disk 30 so as to be incapable of any further significant movement in the horizontal direction (i.e., the direction substantially parallel to the rotational axis of the brake disk 30), the other brake pad element 36 moves with the caliper 28 towards the brake disk 30 to impart a braking force to the brake disk 30 on the opposite side of the brake disk. As the brake pad 38 is urged against the rotating brake disk 30, the brake pad 34 and wedge element 40 are dragged along by and moved with the brake disk 30 in the direction illustrated by the arrow 52 (i.e., in the generally vertical direction). This movement of the brake pad 34 and wedge element 40 causes the pressure increasing wedge element 44 to move in the direction illustrated by the arrow 54 (i.e., in the horizontal direction) due to the inclined surfaces on the two wedge elements 40, 44. This causes the pressure in the wheel cylinder to rise rather quickly. Once the force applied to the brake pedal 12 is removed, the return spring 50 returns the brake pad element 34 to its resting position shown in FIG. 2 so that a subsequent pressure increasing operation can be performed the next time the pedal 12 is operated.

As noted previously, since the hose 26 and the brake line 25 which connects the pump 20 to the wheel cylinder 24 are compliant, they expand when hydraulic fluid is pumped from the pump. The volumetric increase associated with this expansion is filled rather quickly by the relatively rapid increase in wheel cylinder pressure caused by the movement of the pressure increasing wedge element 44 in the direction illustrated by the arrow 54. As a result, it is possible to achieve a quicker brake response than would otherwise be the case. Consequently, the power output associated with the pump can be reduced, or at least need not be increased to improve the response characteristics of the brake system. This means that the size, energy consumption and weight associated with the pump can also be reduced. Thus, a smaller, lighter and more energy efficient pump can be utilized. This system is also capable of compensating for other forms of compliance in the brake system such as those noted above (e.g., the compressibility of the hydraulic fluid, the deflection or deformation of the brake caliper, and the initial movement of the brake pad element).

As can be readily appreciated, the pressure increasing element 44 is self-energizing by virtue of the fact that vertical movement of the brake pad element 24 causes immediate horizontal movement of the brake pad element 44. The self-energizing power produced by movement of the brake pad element 44 compensates for the volumetric increase resulting from the compliant nature of the various parts of the brake system.

Figure 3:
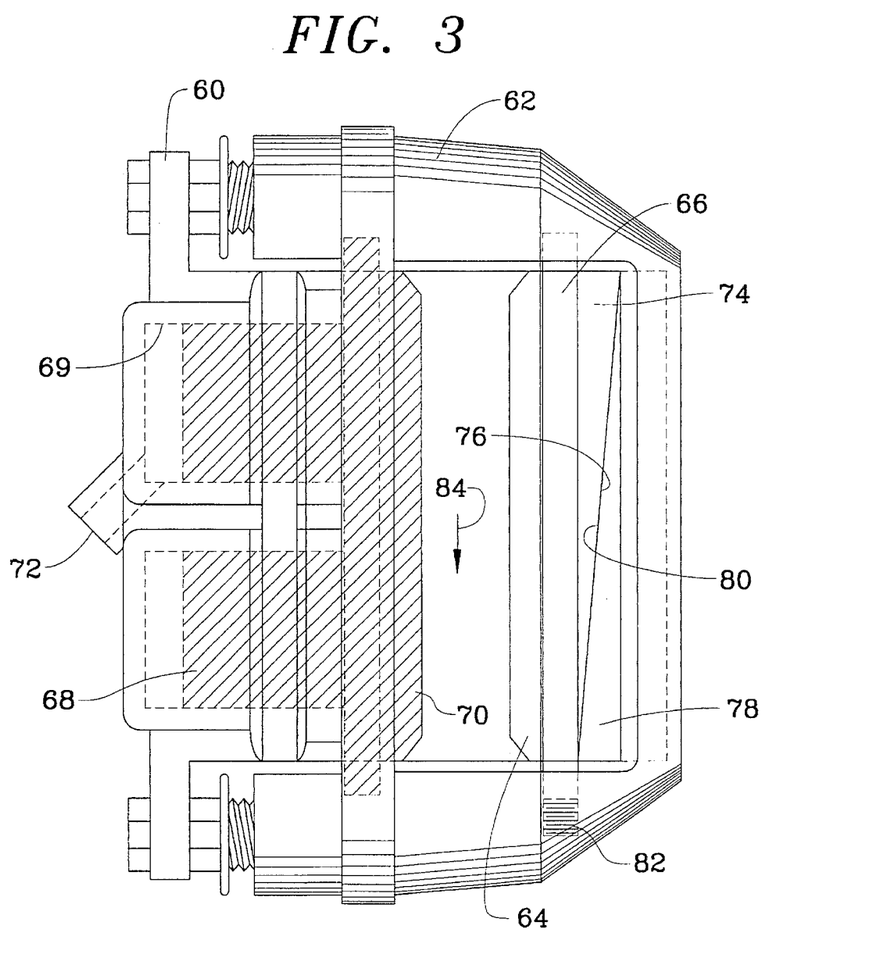
FIG. 3 is a bottom view of a wheel cylinder in accordance with another embodiment of the present invention.

FIG. 3 illustrates an alternative embodiment of the wheel cylinder used in conjunction with the hydraulic brake system illustrated in FIG. 1. The wheel cylinder includes a caliper moving body 60 and a caliper floating body 62. Mounted on the caliper moving body 60 is a brake pad element that includes a brake pad 64, a brake pad fixing plate 66 and a wedge element 74. Another brake pad 70, which is fixed to a wheel cylinder piston 68, is positioned in opposing relation to the brake pad 64. The wheel cylinder piston 18 is positioned within a cylinder 69. The wheel cylinder depicted in FIG. 3 is designed so that the brake pads 64, 70 are positioned on opposite sides of a brake disk (not shown).

Hydraulic fluid enters the wheel cylinder by way of an inlet 72 and forces the wheel cylinder piston 68 and the attached brake pad 70 to the right into engagement with the brake disk that is positioned between the two brake pads 64, 70. When the brake pad 70 contacts the rotating brake disk, the caliper moving body 60 along with the brake pad 64, the brake pad plate 66 and the wedge element 74 will be moved to the left.

The wedge element 74 is similar to the wedge element 40 described above in connection with FIG. 2. The wedge element 74 is provided with an inclined surface 76 and is positioned in opposing relation to another wedge element 78. The wedge element 78 is similar to the pressure increasing wedge element 44 described above in connection with FIG. 2 and is fixed to the caliper moving body 60. An inclined surface 80 is provided on the pressure increasing wedge element 78 and this inclined surface 80 faces the inclined surface 76 on the wedge element 74.

The brake pad element defined by the combination of the brake pad 64, the brake pad plate 66 and the wedge element 74 is urged in the direction opposite the direction indicated by the arrow 84 as a result of the biasing force of a spring or other type of biasing device 82 disposed between the caliper floating body 60 and the brake pad element. Although not specifically shown in FIG. 3, bearings or other similar roller elements can be provided between the parallel and facing inclined surfaces 76, 80 of the wedge elements 74, 78.

The operation of the embodiment of the wheel cylinder compensating mechanism illustrated in FIG. 3 is similar to that described above in connection with the embodiment shown in FIGS. 1 and 2. That is, when the brake pad 64 is urged against the rotating brake disk, the brake pad 64 along with the brake pad plate 66 and the wedge element 74 are dragged along by or moved with the rotating brake disk in the direction of the arrow 84. The inclined surfaces 76, 80 on the wedge elements 74, 78 cause the generally horizontal movement of the brake pad 64, brake pad plate 66 and wedge element 74 to be converted into generally vertical movement (i.e., movement perpendicular to the movement of the brake pad element) of the wedge element 78. Thus, the wedge element 78 moves away from the brake disk and the brake pad element, thereby causing a relatively quick increase in pressure in the wheel cylinder. As a result, the volumetric increase associated with the compliant nature of the system (e.g., the expansion of the hose 26 and brake line 25, the compressibility of the hydraulic fluid, and the increase in volume in the cylinder 69 which occurs when the brake caliper 28 deflects or when the wheel cylinder piston initially moves) is filled rather rapidly. Consequently, a faster and more immediate response time of the brake system is effected.

When the force applied to the brake pedal is removed so that the pump no longer pumps hydraulic fluid to the wheel cylinder, the brake pad 64, the brake pad plate 66 and the wedge element 74 are returned to the position illustrated in FIG. 3 by the biasing action of the spring 82. Thus, the next time the brake pedal is operated, the pressure increasing function associated with the movement of the wedge elements can be realized. In the embodiment shown in FIG. 3, the spring 82 is a leaf spring, although other types of springs can be employed. Also, the wedge element 78 is fixed to the caliper moving body 60.

Figure 4:
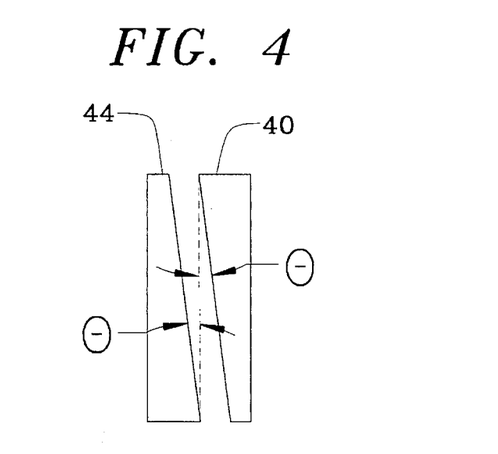
FIG. 4 is an illustration of the two wedge elements having inclined surfaces arranged at a wedge angle.

In the embodiments of the present invention illustrated in FIGS. 1–3, the wedge angle and the return spring characteristics represent parameters to be considered in designing the brake mechanism. As seen in FIG. 4 which generally illustrates the two wedge elements 40, 44 (74, 78), the wedge angle θ represents the angle of inclination of the inclined surfaces 42, 46 of the wedge elements 40, 44. The wedge angle θ should satisfy the following equation:

$$\theta < \tan^{-1}(\mu bp - \mu wcbp);$$

where

θ—wedge angle

μbp—friction between the brake pad and the brake disk

μwcbp—friction between the wedge elements

By way of example, if μwcbp is equal to 0.15 and μbp is equal to 0.4, the wedge angle θ should be less than fourteen degrees. Thus, the wedge angle θ can be appropriately selected within the range of greater than zero degrees and less than fourteen degrees. By selecting a larger wedge angle θ, a quicker response time can be achieved. That is, a larger wedge angle θ will cause the pressure in the wheel cylinder to increase more rapidly since the pressure increasing wedge element 44, 78 will move away from the brake disk to a greater extent than in the case of a smaller wedge angle, thereby filling in the volumetric increase associated with the expansion of the hose more rapidly.

It is preferred that the return spring characteristics be selected in accordance with the following equation:

$$frsp(K_1 \cdot (fcwci(Pwc) - fcideal(Pwc))) = K_2 \cdot Pwc;$$

where frsp—return spring characteristics function $K_1, K_2$—constants fcwci—wheel cylinder compliance characteristics function fcideal—ideal compliance characteristics function Pwc—wheel cylinder pressure.

Figure 5:
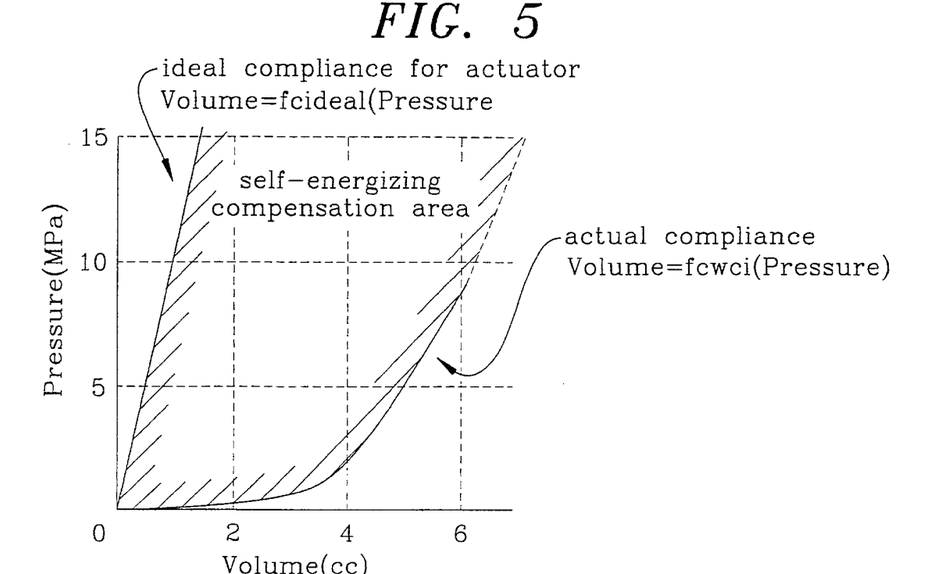
FIG. 5 is a graph of volume versus pressure illustrating a self-energizing compensation area defined by the difference between the actual compliance and the ideal compliance of the brake system.

The foregoing equation is arrived at by considering initially FIG. 5 which represents a graph of pressure versus volume as it relates to the compliance of the hose. The line on the right of the graph in FIG. 5 depicts the actual compliance in a brake system when no self-energizing mechanism for rapidly increasing the pressure in the wheel cylinder is present, while the straight line on the left of the graph represents the desired compliance sought to be achieved through use of the self-energizing mechanism of the present invention. Of course, the ideal compliance can be selected as desired. The area between the two lines represents the compensation area that is to be compensated for through use of the self-energizing mechanism.

To achieve the linear characteristic shown in the graph, the compensation volume represented by the compensation area can be calculated as:

$$(fcwci(Pwc) - fcideal(Pwc)).$$

This compensation volume can be compensated for by the stroke of the wedge element in accordance with the following equation:

$$fcwci(Pwc) - fcideal(Pwc) = Awc \cdot \tan\theta \cdot \text{wedge element stroke},$$

where

Awc—Area of wedge element 44 (78)

The compensation pressure is equivalent to the return spring force as represented by the following equation:

$$Pwc \cdot Awc \cdot \tan\theta = \text{Return spring force}$$

Figure 6:
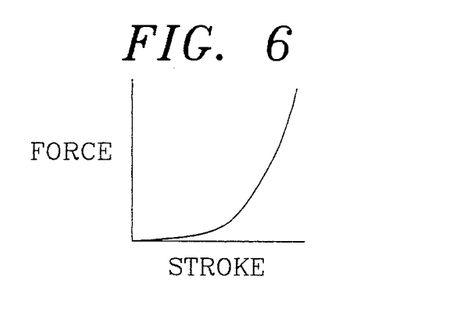
FIG. 6 is a graph illustrating the force versus stroke characteristics of the return spring used in the compensation mechanism of the present invention.

With reference to FIG. 6, the return spring force can be represented by the following equation:

Return spring force=frsp (wedge element stroke).

Thus, $$Pwc \cdot Awc \cdot \tan\theta = frsp((fcwci(Pwc) - fcideal(Pwc))/(Awc \cdot \tan\theta));$$

where $$1/(Awc \cdot \tan\theta) = K_1$$

$$Awc \cdot \tan\theta = K_2$$

An additional characteristic associated with the return spring is that the return spring must be designed to return the brake pad element (i.e., brake pad 38 and wedge element 40, or brake pad 64, brake pad plate 66 and wedge element 74) to the initial position illustrated in FIGS. 2 and 3 when the brake pressure is removed.

In accordance with the discussion set forth above, the return spring characteristics are preferably chosen such the volumetric expansion associated with the hose compliance is quickly filled up with hydraulic fluid as a result of the movement of the self-energizing pressure increasing wedge element. Thus, the return spring should be relatively soft during the initial movement of the brake pad element so that the pressure increase can be effected rather rapidly and the volumetric increase associated with the expansion of the hose can be compensated for relatively quickly.

Figure 7:
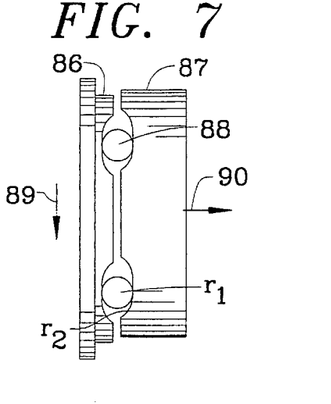
FIG. 7 is a side view of a compensation mechanism in accordance with another embodiment of the present invention.

FIGS. 7–10 illustrate alternative configurations for the brake pad element for achieving a self-energizing pressure increasing power that is perpendicular to the direction in which the brake pad is dragged or moved through rotation of the brake disk. In the embodiment of FIG. 7, facing and aligned pairs of semi-spherical recesses are provided in the brake pad mounting element 86 and the self-energizing pressure increasing element 87. In addition, spherical bearings or roller bodies 88 are positioned within the recesses between the brake pad mounting element 86 and the pressure increasing element 87. Thus, when the brake pad of the brake pad mounting element 86 is urged against the rotating brake disk, the brake pad mounting element 86 will move in the direction of the arrow 89, thereby producing a self-energizing power in the direction of the arrow 90. The same effect can also be gained when the brake pad mounting element 86 is moved in the opposite direction.

In selecting the design parameters for the embodiment of the compensating mechanism shown in FIG. 7, the friction between the brake pad mounting element 86 and the self-energizing pressure increasing element 87 is quite small and thus can be neglected. Thus, the relationship between the push back distance y and the brake pad travel distance x can be expressed in the following manner:

$$y = 2 \cdot (r_2 - r_1) \cdot (1 - \cos\theta), \text{ where}$$

$$\theta = \sin^{-1}\left(\frac{X/2}{r_2 - r_1}\right)$$

$r_2$—radius of recesses in element 87

$r_1$—radius of roller bodies 88.

Given the foregoing relationship and the following design criteria, it is possible to configure the compensating mechanism. The design criteria is preferably selected such that:

$$y \cdot Awc < Cbh_{max},$$

where

Awc—area of the element 87

$Cbh_{max}$—maximum brake hose compliance (volume)

Within the foregoing limitation, the radii $r_1, r_2$ can be selected to achieve the desired response time. That is, a greater push back distance y will result in a faster pressure increase in the wheel cylinder and a resulting quicker response time for the brake. It is possible, therefore, to select the values for $r_1, r_2$ which will achieve the desired amount of push back distance y.

Figures 8, 9:
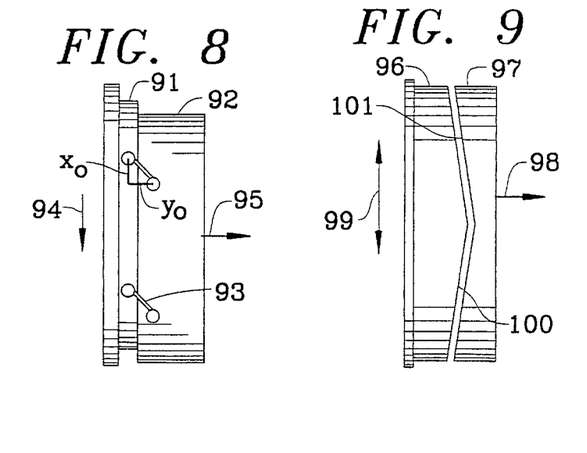
FIG. 8 is a side view of a different compensation mechanism according to an additional embodiment of the present invention.
FIG. 9 is a side view of another compensation mechanism in accordance with a different embodiment of the present invention.

FIG. 8 represents another alternative in which the brake pad element includes a brake pad mounting element 91 connected to the self-energizing pressure increasing element 92 by way of pivotally mounted levers or links 93. As in the case of the embodiment shown in FIG. 7, when the brake pad mounting element 91 is brought into engagement with the rotating brake disk, the brake pad mounting element 91 will be dragged by or moved with the rotating brake disk in the direction of the arrow 94. This will then cause the pressure increasing element 92 to move in the direction of the arrow 95, thereby producing a self-energizing power which rapidly increases the pressure in the wheel cylinder and quickly fills up the volumetric increase associated with the hose compliance so as to produce a faster response time of the brake.

The selection of the design parameters for the embodiments shown in FIG. 8 can be arrived at by first considering that little friction exists between the brake pad mounting element 91 and the pressure increasing element 92. Thus, such friction can be neglected insofar as designing the compensating mechanism. In addition, the following relationship exists between the push back distance y associated with the pressure increasing element 92 and the travel distance x of the brake pad mounting element 91.

$$y = \sqrt{L^2 - (x_o - x)^2} - y_o ,$$

There exists the following preferred limitation on the push back distance y:

$$y \cdot Awc < Cbh_{max};$$

where

Awc—area of the element 92

$Cbh_{max}$—maximum brake hose compliance (volume)

Thus, given the foregoing, the values for the lever length L and the offset $x_o$, $y_o$ can be appropriately selected to achieve the desired pressure response.

FIG. 9 illustrates a different form of the compensating mechanism that is provided with a brake pad element that includes a brake pad mounting element 96 and a self-energizing pressure increasing element 97. In this embodiment, the brake pad mounting element 96 and the pressure increasing element 97 are provided with mating inclined surfaces that provide a self-energizing power in the direction of the arrow 98 based on bi-directional movement of the brake pad mounting element 96 in the directions depicted by the arrow 99. That is, self-energizing push back power can be achieved regardless of whether the brake disk is rotating in one direction or an opposite direction. This is made possible because the inclined surfaces 100, 101 are inclined from an apex or midpoint of each of the brake pad mounting element 96 and the pressure increasing element 97.

Figure 10:
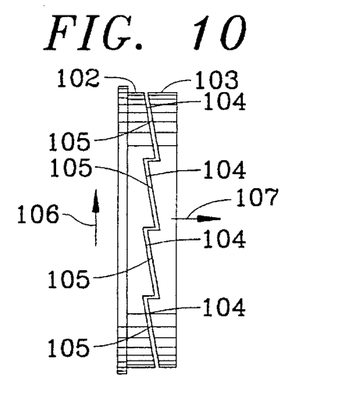
FIG. 10 is a side view of another embodiment of the compensation mechanism in accordance with a further embodiment of the present invention.

FIG. 10 illustrates an embodiment in which the compensating mechanism is designed to have a reduced thickness yet still operate effectively. The compensating mechanism includes a brake pad element comprised of a brake pad mounting element 102 which is provided with a plurality of inclined surfaces and a pressure increasing element 103 that is provided with a complimentary series of inclined surfaces 105. Through the provision of a plurality of spaced apart inclined surface portions 104, 105, each of which is inclined in the same orientation, it is possible to produce a compensating mechanism of reduced thickness as compared to other embodiments described above. As in the case of the other embodiments of the compensating mechanism described above, movement of the brake pad mounting element 102 in the direction of the arrow 106 produces self-energizing power as a result of movement of the pressure increasing element 103 in the direction of the arrow 107.

Through the provision of the various compensation mechanisms described above and illustrated in the drawing figures, it is possible to compensate for the volumetric increase resulting from the expansion of the hose when hydraulic fluid is pumped from the pump to the wheel cylinder. The movement of the self-energizing pressure increasing elements in a direction away from the brake pad mounting element results in a rather rapid increase in pressure in the wheel cylinder, thereby achieving a more rapid response time of the brake during operation. Thus, a smaller, lighter and more energy efficient motor can be employed.

Although FIG. 1 illustrates only a single wheel cylinder associated with one wheel, it is to be understood that the compensation mechanism can be employed in connection with two wheels or possibly all four wheels. Also, appropriate design parameters can be arrived at for the embodiments of the compensating mechanisms shown in FIGS. 9 and 10 through use of an analysis similar to that described above in connection with FIG. 2. Further, bearings or other roller elements similar to those shown in FIG. 2 can be employed in connection with the embodiments depicted in FIGS. 9 and 10.

Figure 11:
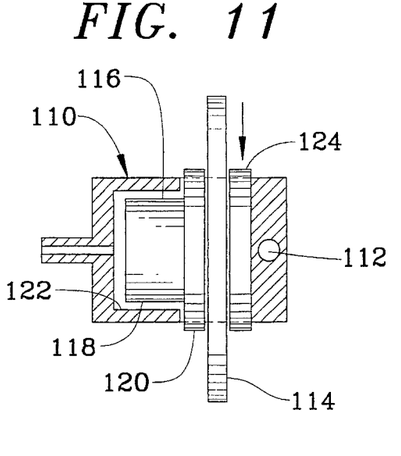
FIG. 11 is a top view of a brake caliper in accordance with embodiment of the invention prior to actuation.
Figure 12:
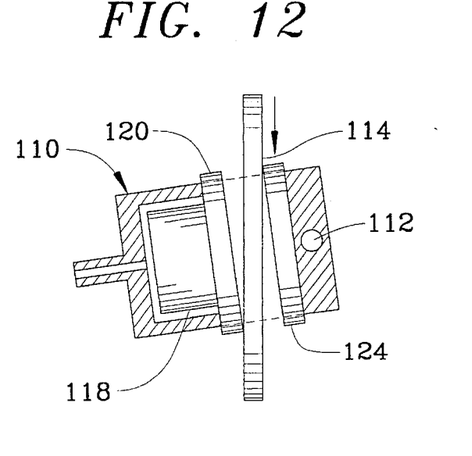
FIG. 12 is a top view of the brake caliper shown in FIG. 11 during actuation.

FIGS. 11 and 12 illustrate another embodiment in accordance with the present invention. With reference to FIG. 11, a brake caliper 110 is pivotally mounted with respect to the brake disk 114 at a pivot point 112. Movably mounted with respect to the brake caliper 110 is a brake pad element 116. The brake pad element 116 includes a wheel cylinder piston 118 positioned within a cylinder 122 and a brake pad 120 fixed to the wheel cylinder piston 118. Fixed to the brake caliper 110 on the opposite side of the brake disk 114 is another brake pad 124.

FIG. 11 illustrates the brake caliper prior to actuation while FIG. 12 illustrates the brake caliper 110 during actuation when hydraulic fluid pressure is supplied to the brake caliper 110. From the arrangement shown in FIG. 11 with the brake disk 114 rotating in the direction represented by the arrow, hydraulic fluid pressure is supplied to the brake caliper 110 to force the brake pad element 116 into contacting engagement with the rotating brake disk 114. When the brake pad 120 contacts the rotating brake disk 114, the other brake pad 124 is urged into contacting engagement with the opposite side of the brake disk 114 as a result of sliding movement of the brake caliper moving body. As the brake pad 120 contacts the rotating brake disk 114, the brake pad 120 is dragged along with the rotating brake disk 114. This then causes the brake caliper to assume the position illustrated in FIG. 12 in which the brake caliper is rotated in the counterclockwise direction. This rotation of the brake caliper causes the movable brake pad element 116 to automatically slide back to the left into the cylinder 122, thereby causing the pressure in the wheel cylinder to rise rather quickly. As a result of this self-energizing arrangement, the various compliant characteristics of the brake system such as those discussed above are compensated for in a rather quick and effective manner.

Figure 13:
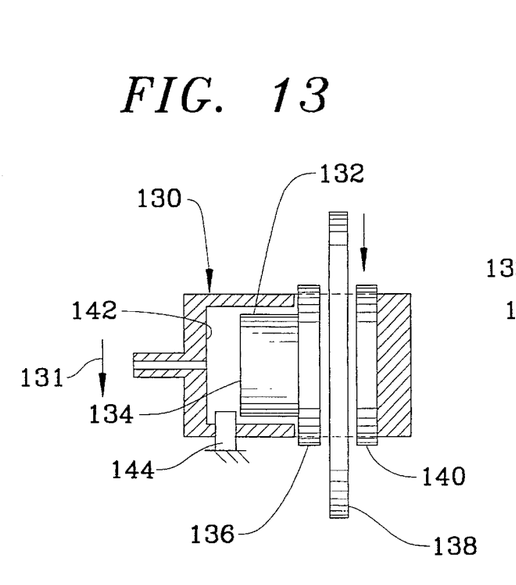
FIG. 13 is a top view of a brake caliper in accordance with another embodiment of the invention prior to actuation.
Figure 14:
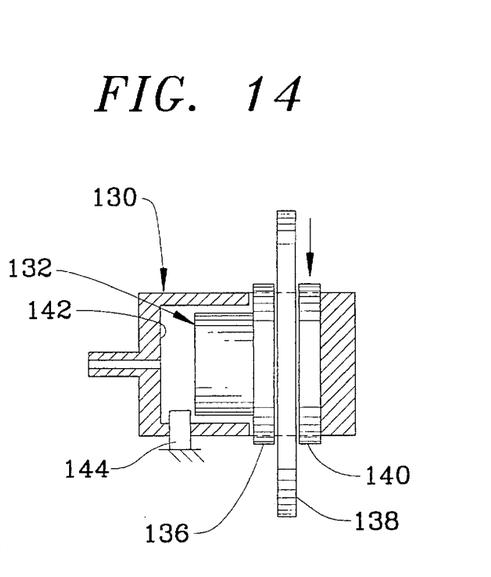
FIG. 14 is a top view of the brake caliper shown in FIG. 13 during actuation.

Another embodiment of the present invention is illustrated in FIGS. 13 and 14 and includes a slidably movable brake caliper 130 that is adapted to be moved in the direction illustrated by the arrow 131. A movable brake pad element 132 which is mounted on the brake caliper 130 is comprised of a wheel cylinder piston 134 and a brake pad 136. The brake pad 136 is positioned on one side of the rotating brake disk 138 and another brake pad 140 is positioned on the opposite side of the rotating brake disk 138. A fixed piston 144 extends into a through hole that communicates with the interior of the cylinder 142.

FIG. 13 illustrates the brake caliper prior to actuation while FIG. 14 illustrates the brake caliper during actuation when hydraulic pressure has been supplied. When hydraulic fluid pressure is supplied to the brake caliper, the brake pad element 132 is urged towards the rotating brake disk 138 so that the brake pad 136 contacts the brake disk 138. The other brake disk 140 is then urged into contacting engagement with the opposite side of the rotating brake disk 138. As the brake disks 138, 140 are urged into contact with the rotating brake disk 138, the brake pads 136, 140, and indeed the caliper 130 as a whole, is dragged with the rotating brake disk 138. Consequently, the brake caliper 130 moves or slides in the direction illustrated by arrow 131 so that the fixed piston 144 automatically moves into the interior of the cylinder 142. This movement of the piston 144 into the cylinder 142 causes a relatively rapid increase in wheel cylinder pressure since the hydraulic fluid is forced back towards the source. Thus, this self-energizing system compensates for the various compliance characteristics discussed above.

Figure 15:
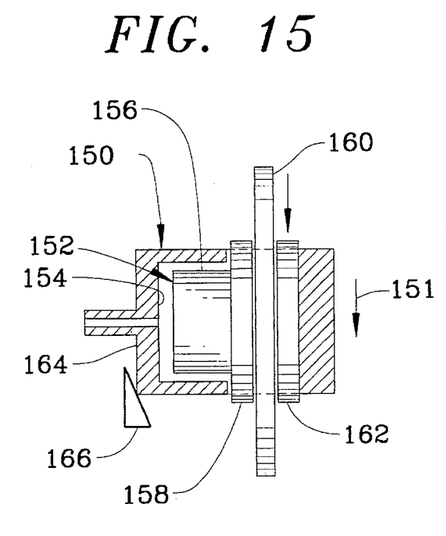
FIG. 15 is a top view of a brake caliper in accordance with another embodiment of the invention prior to actuation.

FIGS. 15–18 illustrate a further embodiment of the brake caliper according to the present invention. As seen in FIG. 15, the brake caliper 150, which is adapted to be slidably moved in the direction of the arrow 151, includes a brake pad element 152 movably positioned within a cylinder 154 of the brake caliper 150. The brake pad element 152 is comprised of a wheel cylinder piston 156 and an integrally attached brake pad 158 that is disposed on one side of the rotating brake disk 160. Mounted on the opposite side of the rotating brake disk 160 is another brake pad 162.

As noted above, the brake caliper 150 is adapted to be slid in the direction of the arrow 151. During such sliding movement, one arm 164 of the brake caliper 150 is adapted to engage an inclined surface of a fixed stop 166. As best illustrated in the side view of FIGS. 17 and 18, the arm 164 of the brake caliper 150 is pivotally mounted at a pivot 168 relative to the remainder of the brake caliper 150. The inclined surface of the fixed stop 166 causes the arm 164 of the brake caliper 150 to pivot or rotate inwardly towards the rotating brake disk 160 during sliding movement of the brake caliper 150.

Figure 16:
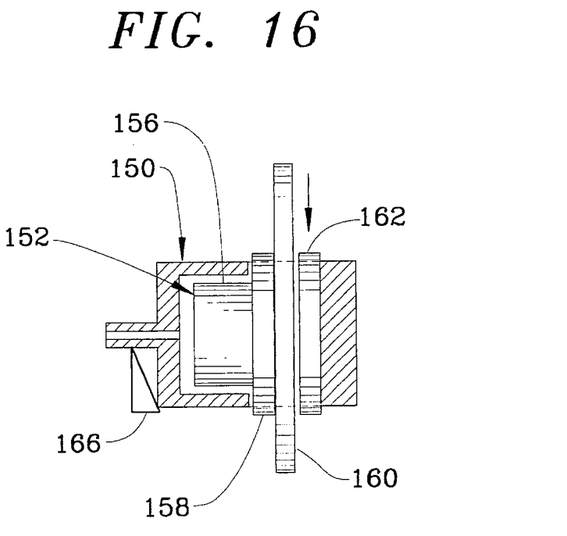
FIG. 16 is a top view of the brake caliper shown in FIG. 15 during actuation.
Figure 17:
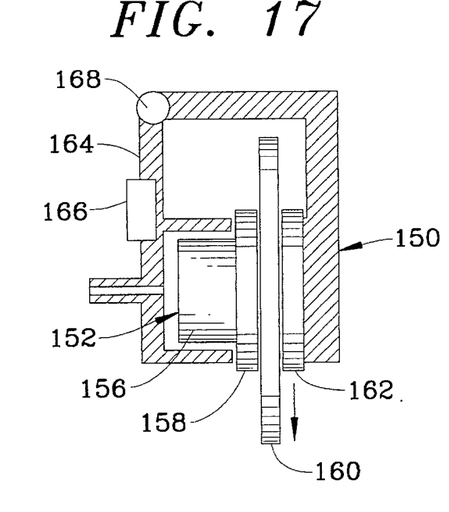
FIG. 17 is a side view of the brake caliper shown in FIG. 15.
Figure 18:
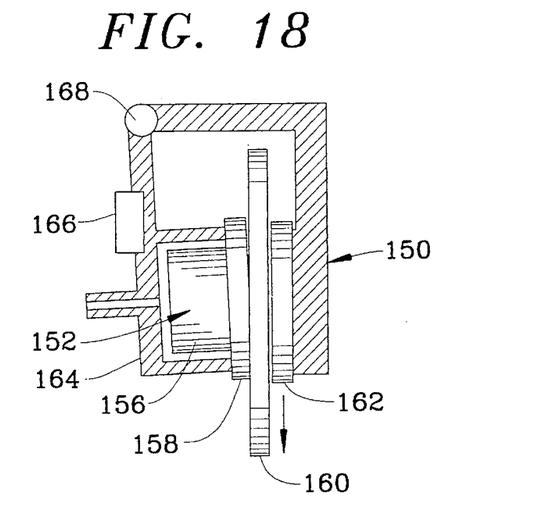
FIG. 18 is a side view of the brake caliper shown in FIG. 16.

FIGS. 15 and 17 illustrate the brake caliper 150 in the non-actuated position while FIGS. 16 and 18 illustrate the brake caliper during actuation when hydraulic fluid pressure is applied. From the position illustrated in FIGS. 15 and 17, hydraulic fluid pressure is supplied from the source to urge the brake pad element 152 towards the right so that the brake pad 158 contacts the rotating brake disk 160. The other brake pad 162 is also forced into contacting engagement with the opposite side of the rotating brake disk 160. As the brake pads 158, 162 contact the rotating brake disk 160, the rotating brake disk 160 tends to drag the brake pads 158, 162 in the direction of rotation of the brake disk 160. This causes the brake caliper 150 to slide or move in the direction of arrow 151 to the position shown in FIG. 16. The sliding movement of the brake caliper 150 causes the arm 164 of the brake caliper 150 to pivot or rotate in the counterclockwise direction about the pivot 168 as shown in FIG. 18 due to the engagement of the arm 164 with the inclined surface of the fixed stop 166. As a result of the rotation of the arm 164 of the brake caliper 150, the brake pad element 152 is automatically moved to the left to cause an increase in pressure in the wheel cylinder. Thus, the volumetric increase associated with the various compliance characteristics of the brake system described above is filled rather rapidly. As a result, a faster response time of the brake system is realized.

In each of the embodiments of the brake system described above, the system is characterized by the fact that while hydraulic fluid pressure is being supplied to the brake caliper from the source, the caliper forces hydraulic fluid back towards the source. Also, in each of the disclosed embodiments, the volume of hydraulic fluid in the cylinder that receives the movable brake pad element, and indeed the volume of the cylinder itself, is reduced while hydraulic fluid pressure is being supplied from the source. This application of hydraulic fluid pressure from the hydraulic fluid pressure source to the brake caliper and the simultaneous application of an opposing hydraulic fluid pressure from the brake caliper toward the fluid source effects a rather fast compensation of the compliance characteristics mentioned above associated with the brake system. Further, the simultaneous application of hydraulic fluid pressure from the source as well as from the brake caliper causes a rather rapid filling up of the volumetric increase associated with such compliant characteristics, thereby resulting in a faster and more immediate response time of the brake system.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A hydraulic brake system for a vehicle comprising:

a master cylinder supplying brake pressure through operation of an operating member of the vehicle;

a wheel cylinder mountable adjacent a rotatable brake disk of the vehicle, said wheel cylinder including a brake caliper;

a bi-directional pump disposed between the master cylinder and the wheel cylinder for pumping hydraulic fluid to the wheel cylinder a tubular member connecting the pump to the wheel cylinder, said tubular material being made of compliant material which expands when brake pressure is supplied to the wheel cylinder by the pump;

a brake pad mounted on the brake caliper and movable toward the brake disk as a result of brake pressure to impart a braking force to the brake disk, said brake pad being movable with the brake disk when the brake pad is urged against the brake disk;

a pressure increasing element positioned adjacent the brake pad and movable toward and away from the brake pad;

means for causing the pressure increasing element to move away from the brake pad when the brake pad is urged against and moves with the brake disk to effect a relatively fast increase in brake pressure downstream of the pump and thereby achieve a relatively fast filling in of a volumetric increase in the tubular member caused by expansion of the compliant material; and a pressure controller operatively associated with the bi-directional pump to increase the brake pressure supplied by the master cylinder during operation of the operating member and thereby increase the brake pressure supplied to the wheel cylinder.

2. A hydraulic brake system for a vehicle according to claim 1, wherein said brake pad is movable relative to the brake caliper.

3. A hydraulic brake system for a vehicle according to claim 1, wherein said brake pad is fixed relative to the brake caliper so that movement of the brake caliper results in movement of the brake pad.

4. A hydraulic brake system for a vehicle according to claim 1, including a spring element operatively associated with the brake pad for urging the brake pad in a direction away from the direction in which the brake pad moves with the brake disk.

5. A hydraulic brake system for a vehicle according to claim 1, wherein said brake pad is mounted on a brake pad mounting element, said means for causing the pressure increasing element to move away from the brake pad including said pressure increasing element and said brake pad mounting element each having at least one inclined surface, the at least one inclined surface of the brake pad mounting element facing the at least one inclined surface of the pressure increasing element.

6. A hydraulic brake system for a vehicle according to claim 1, wherein said brake pad is mounted on a brake pad mounting element, said means for causing the pressure increasing element to move away from the brake pad including said pressure increasing element and said brake pad mounting element each being provided with recesses, and bearings each disposed between one of the recesses in the pressure increasing element and one of the recesses in the brake pad mounting element.

7. A hydraulic brake system for a vehicle according to claim 1, wherein said brake pad is mounted on a brake pad mounting element, said means for causing the pressure increasing element to move away from the brake pad including said pressure increasing element and said brake pad mounting element each having a plurality of spaced apart inclined surface portions, the inclined surface portions on the brake pad mounting element facing the inclined surface portions on the pressure increasing element.

8. A hydraulic brake system for a vehicle according to claim 1, wherein said brake pad is mounted on a brake pad mounting element, said means for causing the pressure increasing element to move away from the brake pad including said pressure increasing element being connected to said brake pad mounting element by a plurality of links.

9. Hydraulic brake system having compliant characteristics for braking a vehicle wheel comprising:

a hydraulic fluid source which supplies pressurized hydraulic fluid;

a connecting system having a first end connected to the hydraulic fluid source and an oppositely located second end;

a wheel cylinder for being mounted adjacent a brake disk of the vehicle wheel, the wheel cylinder being connected to the second end of the connecting system, the wheel cylinder including a brake caliper being provided with a brake pad element for being urged against the brake disk upon the application of a hydraulic fluid pressure to impart a braking force to the brake disk, said brake pad element being movable with the brake disk when the brake pad element is urged against the brake disk;

pressure increasing means for automatically forcing hydraulic fluid from the caliper toward the hydraulic fluid source as a result of said brake element being moved with the brake disk to increase the pressure upstream of the brake caliper in a relatively rapid manner and thereby compensate for compliant characteristics in the brake system; and pressure modulating means disposed in the connecting system for increasing and reducing the hydraulic fluid pressure supplied from the hydraulic fluid source during operation of an operating member of the vehicle.

10. Hydraulic brake system according to claim 9, including a spring device operatively associated with the brake pad element for urging the brake pad element in a direction opposite the direction in which the brake pad element is moved with the brake disk.

11. Hydraulic brake system according to claim 10, wherein said pressure increasing means includes said brake pad element having an inclined surface and a pressure increasing element positioned adjacent said brake pad element and having an inclined surface, the inclined surface of the brake pad element facing the inclined surface of the pressure increasing element.

12. Hydraulic brake system according to claim 9, wherein said pressure modulating means includes a pump connected to the hydraulic fluid source, said pump being connected to the brake caliper by way of a brake hose made of compliant material.

13. Hydraulic brake system according to claim 9, wherein said pressure increasing means includes said brake caliper being rotationally mounted at a pivot point and said brake pad element including a wheel cylinder piston slidably positioned in a cylinder of the brake caliper, said cylinder being connected to the second end of the connecting system, said brake pad element being moved in a first direction towards the brake disk by hydraulic fluid pressure from the source and being moved in a second direction opposite said first direction upon rotation of the brake caliper.

14. Hydraulic brake system according to claim 9, wherein said brake caliper is slidably mounted for movement with the brake pad element when the brake pad element is moved with the brake disk, said brake pad element being movably positioned in a cylinder, said pressure increasing means including a fixed piston extending through an opening in said cylinder, said fixed piston being forced inwardly into the cylinder when the brake caliper slides with the brake pad element.

15. Hydraulic brake system according to claim 9, wherein said brake caliper is slidably mounted for movement with the brake pad element when the brake pad element is moved with the brake disk, said pressure increasing means including one side of said brake caliper being pivotally mounted on a remaining portion of the brake caliper.

16. Hydraulic brake system according to claim 15, wherein said pressure increasing means includes a fixed stop which is engaged by said one side of the brake caliper, said fixed stop having an inclined surface which causes said one side of the brake caliper to pivot when the brake caliper slides with the brake pad element.

17. Hydraulic brake system according to claim 15, wherein said brake pad element is movably positioned in a cylinder provided in said one side of the brake caliper.

18. Hydraulic brake system having compliant characteristics for a vehicle comprising:

a master cylinder for supplying pressurized hydraulic fluid;

a wheel cylinder mountable adjacent a rotatable brake disk of a vehicle wheel, said wheel cylinder including brake caliper provided with a movable brake pad element which is movable in a first direction towards the rotatable brake disk under hydraulic pressure from the master cylinder so as to be urged into contacting engagement with the rotating brake disk to impart a braking force to the rotating brake disk and which is movable in a second direction opposite said first direction, said brake pad element being moved with the rotatable brake disk when the brake pad element is urged into contacting engagement with the rotatable brake disk;

a connecting arrangement connecting the master cylinder and the wheel cylinder for delivering hydraulic fluid under pressure from the master cylinder to the brake caliper upon operation of an operating member of the vehicle;

means for causing the brake pad element to automatically move in the second direction as a result of the brake pad element being moved with the rotating brake disk and while hydraulic fluid is being supplied under pressure from the master cylinder to the brake caliper to effect a relatively rapid increase in pressure upstream of the brake pad element and compensate for compliant characteristics associated with the brake system; and pressure modulating means disposed in the connecting arrangement between the master cylinder and the wheel cylinder for increasing and reducing the hydraulic pressure supplied from the master cylinder to the wheel cylinder during operation of an operating member of the vehicle.

19. Hydraulic brake system according to claim 18, wherein the pressure modulating means includes a pump, and the connecting arrangement includes a brake line and a brake hose.

20. Hydraulic brake system according to claim 18, wherein the brake pad element includes a brake pad mounted on a brake pad mounting element and a pressure increasing element positioned adjacent the brake pad mounting element, said brake pad mounting element and said pressure increasing element each having inclined surfaces that face one another and interact with one another to cause the pressure increasing element to move away from the brake pad mounting element when the brake pad is dragged with the brake disk.

* * * * *